US012669163B2

(12) United States Patent
Zhang

(10) Patent No.: US 12,669,163 B2
(45) Date of Patent: Jun. 30, 2026

(54) SHOCK-ABSORBING DEVICE, GIMBAL, AND UNMANNED AERIAL VEHICLE

(71) Applicant: AUTEL ROBOTICS CO., LTD., Shenzhen (CN)

(72) Inventor: Zhengli Zhang, Shenzhen (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 90 days.

(21) Appl. No.: 18/392,151

(22) Filed: Dec. 21, 2023

(65) Prior Publication Data

US 2024/0117858 A1     Apr. 11, 2024

Related U.S. Application Data

(63) Continuation of application No. PCT/CN2022/099396, filed on Jun. 17, 2022.

(30) Foreign Application Priority Data

Jun. 22, 2021     (CN) .......................... 202110692173.4

(51) Int. Cl.
| | |
|---|---|
| *F16F 15/08* | (2006.01) |
| *B64U 20/87* | (2023.01) |
| *B64U 101/30* | (2023.01) |
| *F16M 11/12* | (2006.01) |

(52) U.S. Cl.
CPC .............. *F16F 15/08* (2013.01); *B64U 20/87* (2023.01); *F16M 11/123* (2013.01); *B64U 2101/30* (2023.01)

(58) Field of Classification Search
CPC ......... B64U 20/87; F16F 15/08; B64D 47/08; F16M 11/123; F16M 13/02; F16M 2200/041
USPC ....... 248/559, 560, 562, 566, 609, 632, 634, 248/638
See application file for complete search history.

(56) References Cited

U.S. PATENT DOCUMENTS

| | | | | |
|---|---|---|---|---|
| 2016/0146283 A1* | 5/2016 | Sato | ......................... | F16F 15/08 267/141.1 |
| 2017/0268225 A1* | 9/2017 | Wake | ..................... | B32B 27/20 |

(Continued)

FOREIGN PATENT DOCUMENTS

| | | |
|---|---|---|
| CN | 207315970 U | 5/2018 |
| CN | 212177758 U | 12/2020 |

(Continued)

*Primary Examiner* — Alfred J Wujciak

(57)     ABSTRACT

The present disclosure relates to the technical field of aircraft, and discloses a shock-absorbing device, a gimbal, and an unmanned aerial vehicle, including a first fixing plate; second fixing plates disposed on one side of the first fixing plate at intervals; and a first shock-absorbing mechanism including a first elastic member connected between the first fixing plate and the second fixing plate. The first elastic member has a hollow structure, the first elastic member has a circular cross-section in a direction parallel to the first fixing plate, the first elastic member includes a first installing portion, a second installing portion, and a first buffering portion connected between the first installing portion and the second installing portion, the first installing portion is fixed to the first fixing plate, and the second installing portion is fixed to the second fixing plate.

19 Claims, 6 Drawing Sheets

(56)          References Cited

U.S. PATENT DOCUMENTS

2018/0003254 A1 *   1/2018  Ellen ...................... E02F 9/166
2019/0017264 A1 *   1/2019  Kochiyama .............. F16F 1/40

FOREIGN PATENT DOCUMENTS

CN          113374827  A     9/2021
RU            2547736  C1     4/2015

* cited by examiner

1000

100

200

SHOCK-ABSORBING DEVICE, GIMBAL, AND UNMANNED AERIAL VEHICLE

CROSS REFERENCE TO RELATED DISCLOSURE

This application is a continuation of International Application No. PCT/CN2022/099396, filed Jun. 17, 2022, which claims priority to and the benefit of the Chinese patent application No. 2021106921734, filed Jun. 22, 2021, the entireties of which are hereby incorporated herein by reference.

BACKGROUND

Unmanned aerial vehicle gimbal is the support equipment for unmanned aerial vehicles to install and fix a camera and like task loads. Due to different functions and uses of unmanned aerial vehicles, various kinds of sensors or cameras are installed on the unmanned aerial vehicle gimbal, so unmanned aerial vehicle gimbals are designed to have different structures according to actual needs. Limited to the loading capacity of unmanned aerial vehicles, it is generally required to reduce the weight and volume of the gimbal structure and increase the loading capacity of the gimbal under the premise of ensuring the gimbal to work normally. The stability of the structure of the unmanned aerial vehicle gimbal is an important performance index of gimbal performance, which directly affects the image stabilization effect of the gimbal.

In the prior art, when the mount weight of the gimbal is too large or the amplitude of the unmanned aerial vehicle is too large, the mount may generate shaking, so that the unmanned aerial vehicle cannot achieve the expected performance.

Therefore, it is necessary to provide a shock-absorbing device for an unmanned aerial vehicle to improve the stability and safety of unmanned aerial vehicles during an operation.

SUMMARY

The embodiments of the present application relate to the technical field of aircraft, particularly to a shock-absorbing device, a gimbal, and an unmanned aerial vehicle.

In order to solve the above-mentioned technical problem, embodiments of the present disclosure provide a shock-absorbing device, a gimbal, and an unmanned aerial vehicle, so as to improve the stability and safety of the unmanned aerial vehicle during an operation.

The embodiments of the present disclosure solve the technical problems thereof by providing the following technical solutions:

a shock-absorbing device comprising: a first fixing plate; second fixing plates disposed on one side of the first fixing plate at intervals; and a first shock-absorbing mechanism comprising a first elastic member connected between the first fixing plate and the second fixing plate, the first elastic member having a hollow structure, the first elastic member having a circular cross-section in a direction parallel to the first fixing plate, the first elastic member comprising a first installing portion, a second installing portion, and a first buffering portion connected between the first installing portion and the second installing portion, the first installing portion being fixed to the first fixing plate, and the second installing portion being fixed to the second fixing plate.

A gimbal is further disposed by the embodiments of the present application, comprising the shock-absorbing device and the mount, wherein one end of the mount is installed on the first fixing plate, and the other end of the mount extends out of the second fixing plate.

An embodiment of the present application further provides an unmanned aerial vehicle including the gimbal.

The embodiments of the present disclosure have the following beneficial effects.

Compared with the prior art, according to a shock-absorbing device, a gimbal, and an unmanned aerial vehicle provided by the embodiments of the present application, through the arrangement of the first elastic member, the mount is uniformly stressed in the circumferential direction without causing overload in any direction, thereby improving the stability and safety of the gimbal and the unmanned aerial vehicle.

BRIEF DESCRIPTION OF THE DRAWINGS

In order to provide a clearer description of the technical solutions of the embodiments of the present disclosure, a brief introduction will be given below to the accompanying drawings required in the embodiments of the present disclosure. Obviously, the drawings described below are merely some embodiments of the present disclosure. For those of ordinary skills in the art, other drawings can be obtained according to these drawings without involving inventive efforts.

DETAILED DESCRIPTION

Figure 1:
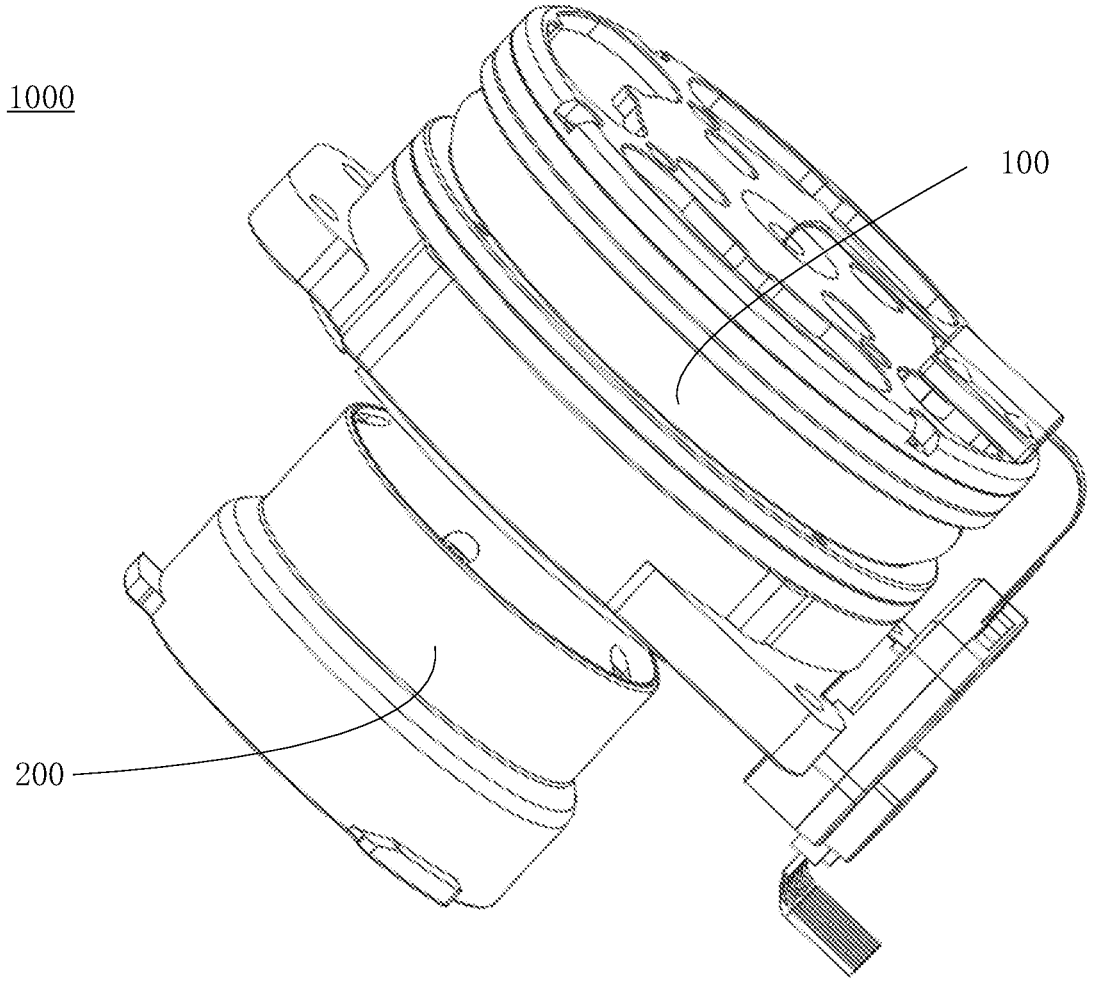
FIG. 1 is a schematic diagram of the structure of a gimbal provided in one of the embodiments of the present disclosure.

In order to make the present disclosure readily understood, a more detailed description of the present disclosure will be rendered with reference to the appended drawings and specific embodiments. It should be noted that when an element is referred to as being "secured to"/"connected to" another element, it can be directly on the other element or one or more intervening elements may be present therebetween. When one element is referred to as being "connected" to another element, it can be directly connected to the other element or one or more intervening elements may be present therebetween. In the description, the orientation or positional relationships indicated by the terms used herein "end", "forward", "backward", etc. are based on the orientation or positional relationship shown in the drawings, and are only for the convenience of describing the disclosure and simplifying the description, rather than indicating or implying that the referred device or element must have a specific orientation, or be constructed and operated in a specific orientation, and therefore cannot be construed as a limitation of the present application. Furthermore, the terms "first", "second", etc. are only configured for descriptive purposes and are not to be construed as indicating or implying relative importance.

Unless defined otherwise, all technical and scientific terms used in the specification have the same meaning as commonly understood by one of ordinary skill in the art to which the present disclosure belongs. The terminology used in the description of the present disclosure is for the purpose of describing specific embodiments only and is not intended to limit the present disclosure.

Furthermore, the technical features involved in the different embodiments of the present application described below can be combined with each other as long as they do not conflict with each other.

Furthermore, the technical features involved in the different embodiments of the present disclosure described below can be combined with each other as long as they do not conflict with each other.

Please also refer to FIG. 1, which shows a gimbal 1000 for unmanned aerial vehicle shock-absorbing provided in one of the embodiments of the present disclosure. The gimbal 1000 comprises a shock-absorbing device 100 and a mount 200. The mount 200 is installed on the shock-absorbing device 100, and the mount 200 is configured for mounting a camera device.

In the shock-absorbing device in the prior art, four shock-absorbing balls are provided at four corner points of a rectangle to achieve shock-absorbing, which cannot take into account any direction, and easily overloads the mount in a certain direction, thus affecting the stability of the gimbal and the unmanned aerial vehicle. In order to reduce the vibration of the mount in the operation process of the unmanned aerial vehicle as much as possible in any direction and improve the stability of the gimbal and the unmanned aerial vehicle, the embodiments of the present application provide a new shock-absorbing device. Please refer to the following for details.

Figure 2:
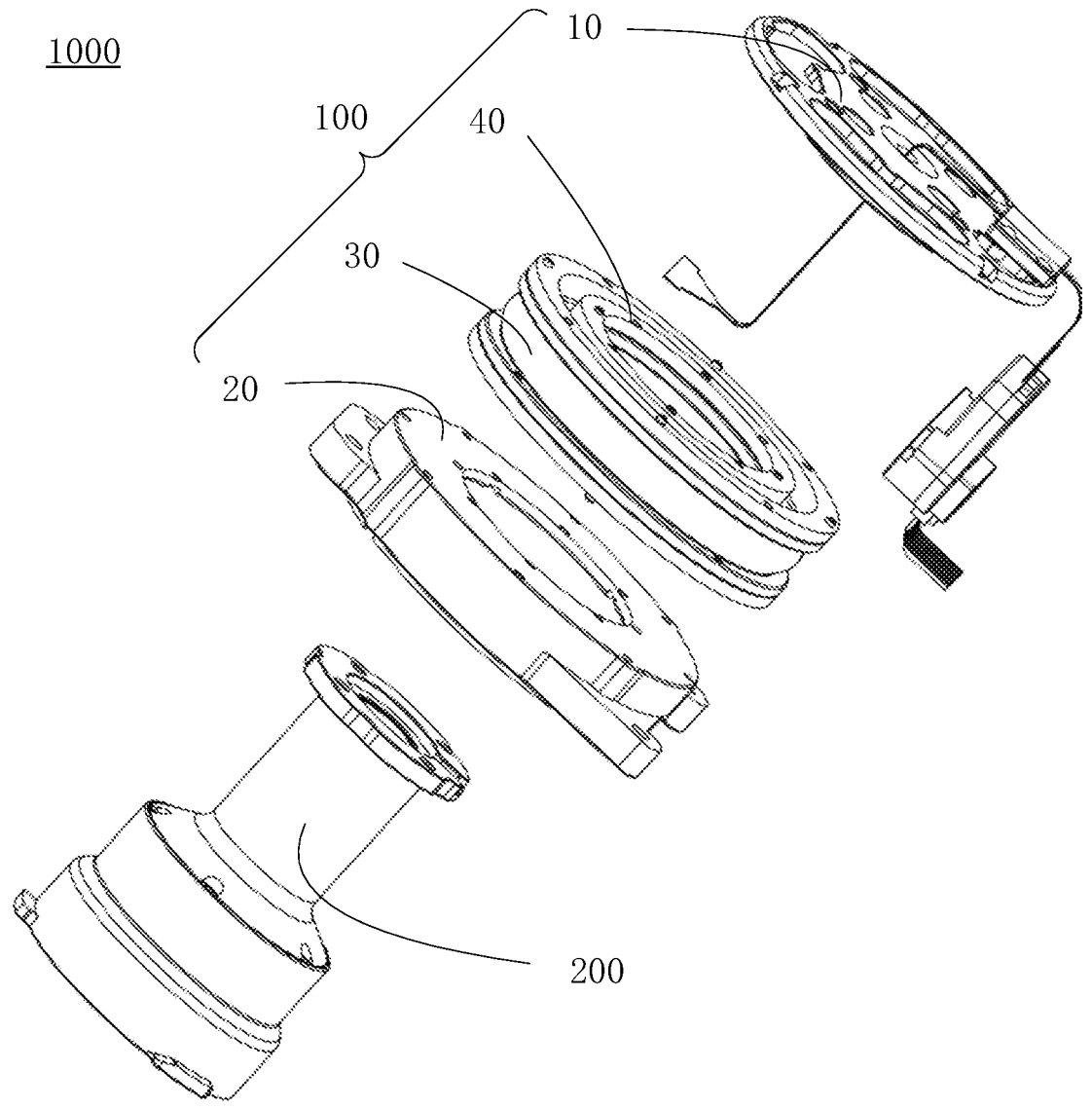
FIG. 2 is a schematic explosive diagram of the gimbal shown in FIG. 1.

Referring to FIG. 2, the shock-absorbing device 100 includes a first fixing plate 10, second fixing plates 20 disposed on one side of the first fixing plate 11 in a parallel interval, a first shock-absorbing mechanism 30 installed between the first fixing plate and the second fixing plate, and a second shock-absorbing mechanism 40 installed in the first shock-absorbing mechanism 30. The shock-absorbing device 100 can firstly reduce most of the vibrations of the unmanned aerial vehicle by the first shock-absorbing mechanism 30, and then eliminate the remaining vibration by the second shock-absorbing mechanism 40, so as to achieve a better shock-absorbing effect.

Figure 3:
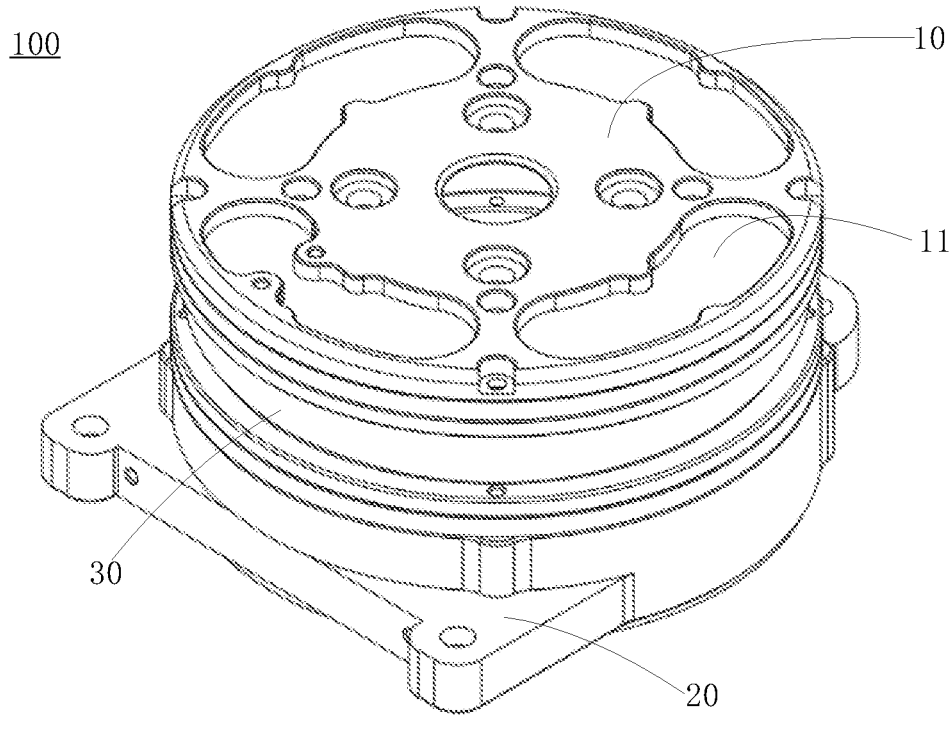
FIG. 3 is a schematic diagram of the structure of a shock-absorbing device in the gimbal shown in FIG. 1.

Referring to FIG. 3, in an embodiment of the present application, the first fixing plate 10 has a circular plate-like structure, and a plurality of weight reducing grooves 11 are evenly spaced on the first fixing plate 10, so as to facilitate the lightening of the shock-absorbing device 100, and to prevent the shock-absorbing device 100 from being too heavy to affect the flight quality of an unmanned aerial vehicle.

It could be understood that in other embodiments, the first fixing plate 10 may have other structures, such as a square structure, etc. and the present application designs the first fixing plate 10 as a circular structure in order to reduce the weight of the first fixing plate 10 as much as possible in cooperation with the shock-absorbing mechanism.

The second fixing plate 20 is installed on an unmanned aerial vehicle to load the gimbal 1000 to the unmanned aerial vehicle so that the shock-absorbing device 100 absorbs shock for the unmanned aerial vehicle.

For the convenience of description, in the present application, the direction in which the first fixing plate 10 extends toward the second fixing plate 20 is the y-direction, and the direction parallel to the first fixing plate 10, i.e. perpendicular to the y-direction, is the x-direction.

Figure 4:
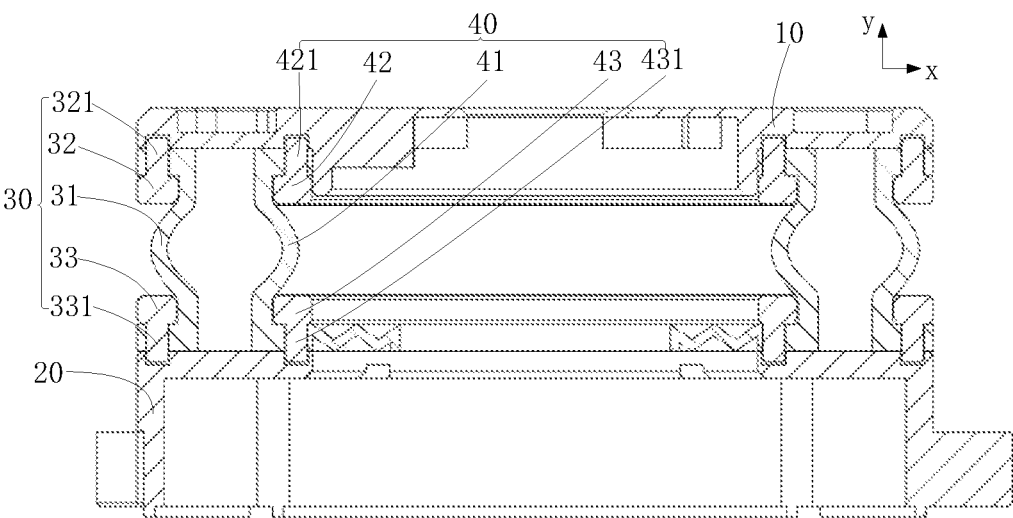
FIG. 4 is a schematic cross-sectional diagram of the shock-absorbing device shown in FIG. 3.
Figure 5:
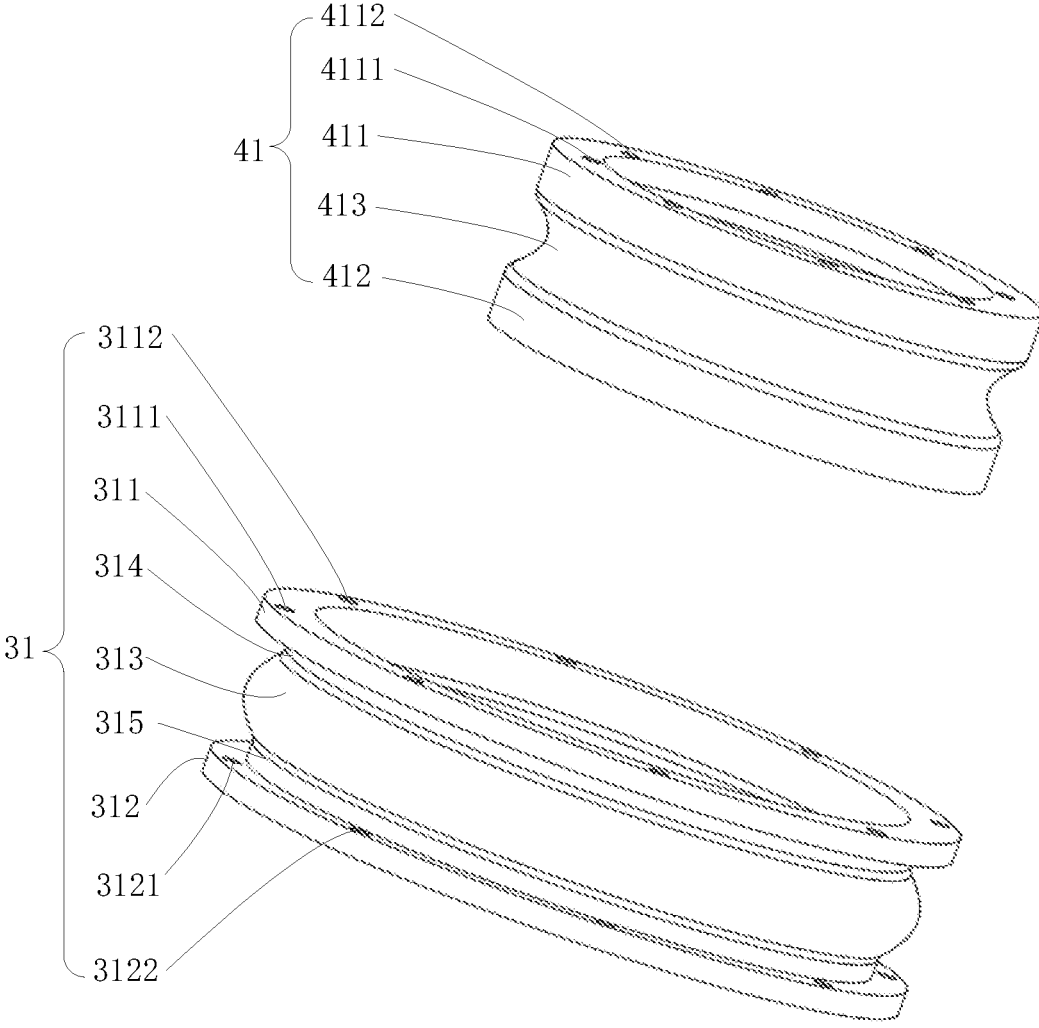
FIG. 5 is a schematic diagram of the structure of a first elastic member and a second elastic member in the shock-absorbing device shown in FIG. 3.

Referring to FIGS. 4 and 5 together, the first elastic member 31 has a hollow structure, a cross-section of the first elastic member 31 in an x direction (a direction parallel to the first fixing plate 10) is circular, and the first elastic member 31 includes a first installing portion 311, a second installing portion 312, and a first buffering portion 313 installed between the first installing portion 311 and the second installing portion 312.

In some embodiments, the first buffering portion 313 has an arcuate structure, and the first buffering portion 313 extends in a direction away from the center of the circle, that is, the first buffering portion 313 extends toward a portion away from the hollow of the first elastic member 31.

It could be understood that in other embodiments, the first buffering portion may have other shapes, such as a wavy line, etc. but the present application contemplates that when the mount 200 is heavy, the buffering portion with an arcuate structure is thicker than the wavy buffering portion and may carry more weight. Therefore, the buffering portion with an arcuate structure is more suitable than the wavy buffering portion.

In some embodiments, the first elastic member 31 is made of a flexible material, such as rubber.

The first shock-absorbing mechanism 30 further includes a first fixing ring 32 by which the first installing portion 311 is fixed to the first fixing plate 10 and a second fixing ring 33 by which the second installing portion 312 is fixed to the second fixing plate 20. A first groove 314 is disposed between the first installing portion 311 and the first buffering portion 313, a second groove 315 is disposed between the second installing portion 312 and the first buffering portion 313, the first fixing ring 32 is disposed in the first groove 314, and the second fixing ring 33 is disposed in the second groove 315.

In some embodiments, in order to facilitate the positioning of the first fixing ring 32 and the second fixing ring 33, several first positioning posts 321 are disposed at intervals on the first fixing ring 32, several first positioning holes 3111 are disposed at intervals along the outer circumference of the first installing portion 311, and the first positioning holes 3111 are configured for accommodating the first positioning posts 321; the second fixing ring 33 is disposed with several second positioning posts 331 at intervals, the second installing portion 312 is provided with several second positioning holes 3121 at intervals along the outer circumference, and the second positioning holes 3121 are configured for accommodating the second positioning posts 331.

In some embodiments, the first shock-absorbing mechanism 30 further comprises a first fastener and a second fastener (not shown), the first installing portion 311 is disposed with several first fixing holes 3112 at intervals along the outer circumference, the first fixing holes 3112 and the first positioning holes 3111 are disposed alternately, the first fixing plate 10 and the first fixing ring 32 are respectively provided with first through holes, and the first fastener is configured for cooperating with the first through holes and the first fixing holes 3112 so as to fix the first installing portion 311 to the first fixing plate 10 via the first fixing ring 32. The second installing portion 312 is provided with several second fixing holes 3122 at intervals along the outer circumference; the second fixing holes 3122 and the second positioning holes 3121 are provided alternately; the second fixing plate 20 and the second fixing ring 33 are respectively disposed with second through holes; and the second fastener is configured for cooperating with the second fixing holes 3122 and the second through holes so as to fix the second installing portion 312 to the second fixing plate 20 via the second fixing ring 33.

In some embodiments, the second shock-absorbing mechanism 40 includes a second elastic member 41 installed between the first fixing plate 10 and the second fixing plate 20 and disposed inside the first elastic member 31.

The second elastic member 41 has a hollow structure, and a cross-section of the second elastic member 41 in the x direction (a direction parallel to the first fixing plate) is circular. The second elastic member 41 comprises a third installing portion 411 fixed to the first fixing plate 10, a fourth installing portion 412 fixed to the second fixing plate, and a second buffering portion 413 connected between the third installing portion 411 and the fourth installing portion 412.

In some embodiments, the second buffering portion 413 has an arcuate structure, and the second buffering portion 413 extends in a direction away from the first buffering portion 313, that is, the second buffering portion 413 extends toward a portion near the hollow portion of the second elastic member 41.

It could be understood that in other embodiments, the second buffering portion may have other shapes, such as a wavy shape, etc. but the present application contemplates that when the mount 200 is heavy, the buffering portion with an arcuate structure is thicker than the wavy buffering portion and may carry more weight. Therefore, the buffering portion with an arcuate structure is more suitable than the wavy buffering portion.

In some embodiments, the second elastic member 32 is made of a flexible material, such as rubber.

In some embodiments, the second shock-absorbing mechanism 40 further includes a third fixing ring 42 by which the third installing portion 411 is fixed to the first fixing plate 10, and a fourth fixing ring 43 by which the fourth installing portion 412 is fixed to the second fixing plate 20.

Figure 6:
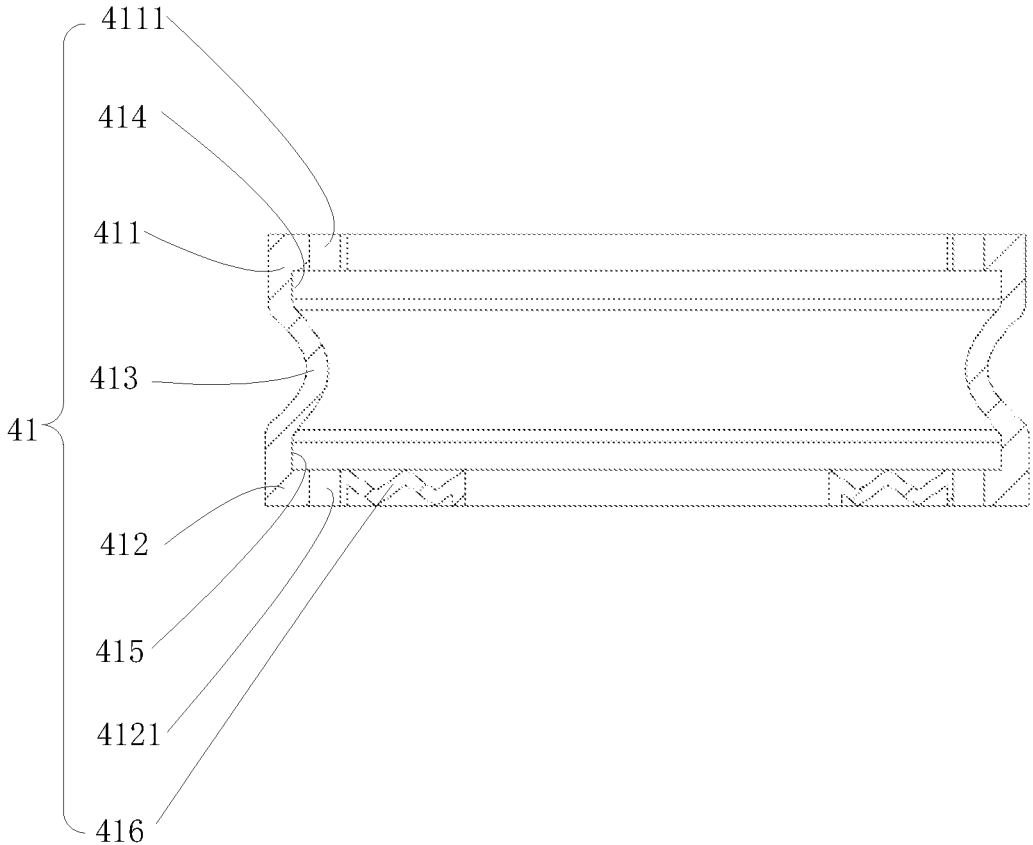
FIG. 6 is a schematic cross-sectional diagram of the second elastic member shown in FIG. 5.

Specifically, please refer to FIG. 6, a third groove 414 is provided between the third installing portion 411 and the second buffering portion 413, a fourth groove 415 is provided between the fourth installing portion 412 and the second buffering portion 413, the third fixing ring 42 is disposed in the third groove 414, and the fourth fixing ring 43 is disposed in the fourth groove 415.

Several third positioning posts 421 are disposed at intervals on the third fixing ring 42, several third positioning holes 4111 are disposed at intervals along the outer circumference of the third installing portion 411, and the third positioning holes 4111 are configured for accommodating the third positioning posts 421. Several fourth positioning posts 431 are provided at intervals on the fourth fixing ring 43, and several fourth positioning holes 4121 (see FIG. 6) are disposed at intervals along the outer circumference of the fourth installing portion 412, and the fourth positioning holes 4121 are configured for accommodating the fourth positioning posts 431.

It could be understood that the third fixing ring 42 and the fourth fixing ring 43 are both provided in the second elastic member 41.

The second shock-absorbing mechanism 40 further comprises a third fastener and a fourth fastener (not shown). Several third fixing holes 4112 are disposed at intervals along the outer circumference of the third installing portion 411, the third fixing holes and the third positioning holes 4111 are disposed alternately, the first fixing plate 10 and the third fixing ring 42 are respectively disposed with third through holes, and the third fastener is configured for cooperating with the third through holes and the third fixing holes 4112 so as to fix the third installing portion 411 to the first fixing plate 10 via the third fixing ring 43. Several fourth fixing holes (not shown) are disposed at intervals along the outer circumference of the fourth installing portion 412, the fourth fixing holes and the fourth positioning holes 4121 are alternately disposed, the second fixing plate 20 and the fourth fixing ring 43 are respectively disposed with fourth through-holes, and the fourth fastener is configured for cooperating with the fourth fixing holes and the fourth through-holes so as to fix the fourth installing portion 412 to the second fixing plate 20 via the fourth fixing ring 43.

In an embodiment of the present application, the first buffering portion 313 and the second buffering portion 413 are both arcuate structures, so that the shock-absorbing device can bear a heavy load; in addition, the first buffering portion 313 and the second buffering portion 413 respectively extend in a direction away from each other, so that the cross sections of the first elastic member and the second elastic member in the y direction are approximately spherical, which can improve the stability of the shock-absorbing device.

Figure 7:
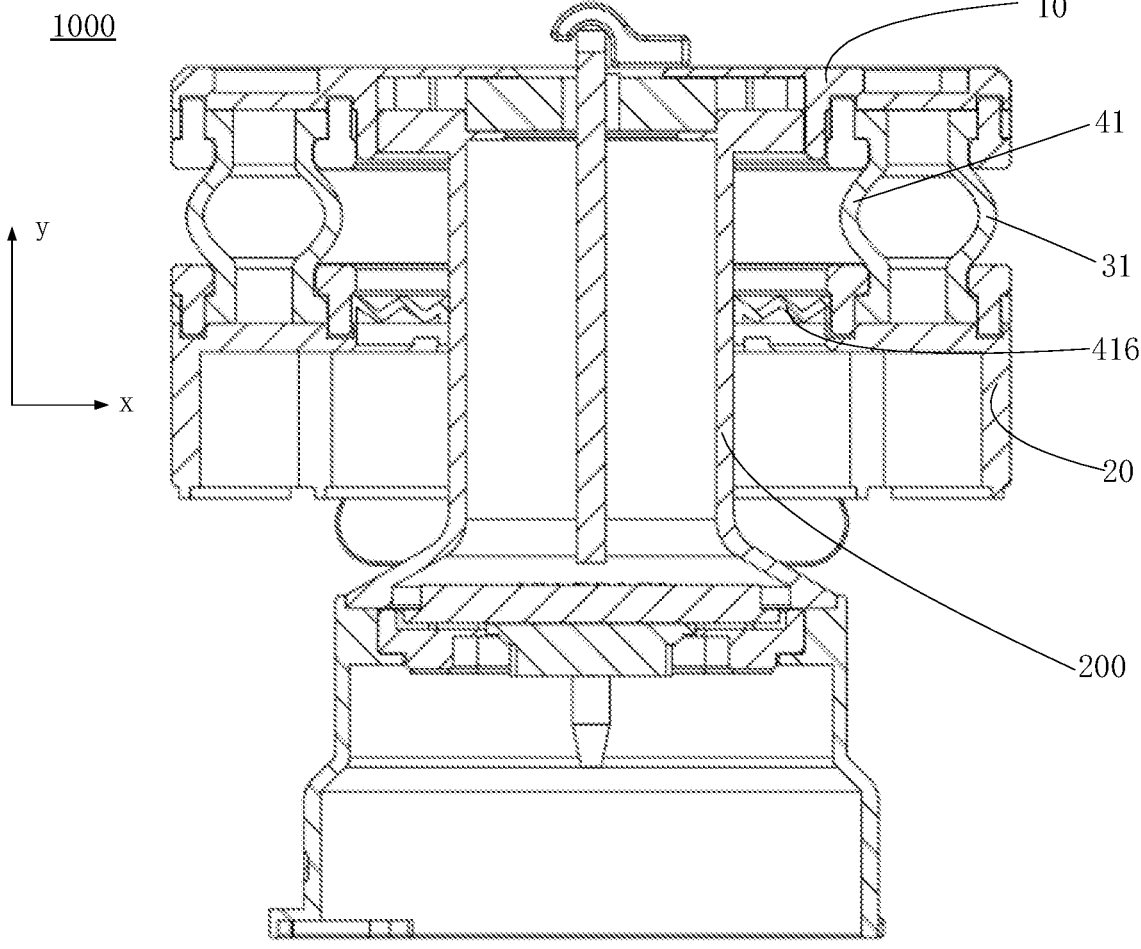
FIG. 7 is a schematic cross-sectional diagram of the gimbal shown in FIG. 1.

Referring to FIG. 7, in some embodiments, the mount 200 is disposed in the second shock-absorbing mechanism 40, one end of the mount 200 is installed on the first fixing plate 10, and the other end of the mount 200 extends out of the second fixing plate 20.

Since the cross sections of the first elastic member 31 and the second elastic member 41 in the x direction are circular, the resistance and elastic force received by the mount 200 are evenly distributed on the circumference during the flight of the unmanned aerial vehicle, so that the mount 200 is not overloaded in a certain direction, thereby improving the stability of the gimbal and the unmanned aerial vehicle.

In order to further improve the stability of the mount 200, the second shock-absorbing mechanism 40 further comprises a third elastic member 416. The third elastic member 416 is hollowed out in the middle, the third elastic member 416 is disposed in the hollow structure of the second elastic member 41, the third elastic member 416 is connected to the fourth installing portion 412, and the third elastic member 416 is disposed around the fourth installing portion 412. The third elastic member 416 is configured for clamping the mount 200 when the mount 200 is installed on the shock-absorbing device 100 so as to improve the stability of the mount 200.

It could be understood that the dimensions of the hollowed-out portion of the third elastic member 416 are adapted to the radial dimensions of the mount 200 provided within the third elastic member.

In some embodiments, the third elastic member 416 is made of a flexible material, such as rubber.

It could be understood that the second fixing plate 20 is provided with an orifice through which the mount 200 passes, and the inner diameters of the third fixing ring 42 and the fourth fixing ring 43 are each larger than the radial dimension of the portion of the mount 200 provided inside the second elastic member 41.

It needs to be noted that the shape of the third elastic member 416 is not limited, and the third elastic member 416 may have a wave shape as long as it can support the mount 200.

In some embodiments, the third elastic member 416 is integrally formed with the second elastic member 41.

In some embodiments, the first elastic member 31, the second elastic member 41, and the third elastic member 416 are integrally formed. At this time, the first installing portion 311 is connected to the third installing portion 411, and the second installing portion 312 is connected to the fourth installing portion 412.

Where, alternatively or additionally, the first buffering portion has an arcuate structure, and the first buffering portion extends to a portion away from the hollow structure.

Where, alternatively or additionally, the first shock-absorbing mechanism further comprises a first fixing ring and a second fixing ring, wherein the first installing portion is fixed to the first fixing plate via the first fixing ring, and the second installing portion is fixed to the second fixing plate via the second fixing ring; and a first groove is disposed between the first installing portion and the first buffering portion, a second groove is disposed between the second installing portion and the first buffering portion, the first fixing ring is disposed in the first groove, and the second fixing ring is disposed in the second groove.

Where, alternatively or additionally, several first positioning posts are disposed at intervals on the first fixing ring, several first positioning holes are disposed at intervals along an outer circumference of the first installing portion, and the first positioning holes are configured for accommodating the first positioning posts; and several second positioning posts are disposed at intervals on the second fixing ring, several second positioning holes are disposed at intervals along the outer circumference of the second installing portion, and the second positioning holes are configured for accommodating the second positioning posts.

Where, alternatively or additionally, the first shock-absorbing mechanism further comprises a first fastener and a second fastener;

several first fixing holes are disposed at intervals along the outer circumference of the first installing portion, the first fixing holes and the first positioning holes are disposed alternately, the first fixing plate and the first fixing ring are respectively disposed with first through holes, and the first fastener is configured for cooperating with the first through holes and the first fixing holes; and several second fixing holes are disposed at intervals along the outer circumference of the second installing portion, the second fixing holes and the second positioning holes are disposed alternately, the second fixing plate and the second fixing ring are respectively disposed with second through holes, and the second fastener is configured for cooperating with the second fixing holes and the second through holes.

Where, alternatively or additionally, the shock-absorbing device further comprises a second shock-absorbing mechanism, the second shock-absorbing mechanism comprising a second elastic member installed between the first fixing plate and the second fixing plate and disposed in the first elastic member.

Where, alternatively or additionally, the second elastic member is a hollow structure, a cross-section of the second elastic member in a direction parallel to the first fixing plate is circular, the second elastic member comprises a third installing portion, a fourth installing portion, and a second buffering portion connected between the third installing portion and the fourth installing portion, the third installing portion is fixed to the first fixing plate, and the fourth installing portion is fixed to the second fixing plate.

Where, alternatively or additionally, the second buffering portion has an arcuate structure, and the second buffering portion extends toward a portion near the hollow structure of the second elastic member.

Where, alternatively or additionally, the second shock-absorbing mechanism further comprises a third fixing ring and a fourth fixing ring, wherein the third installing portion is fixed to the first fixing plate via the third fixing ring, and the fourth installing portion is fixed to the second fixing plate via the fourth fixing ring; and a third groove is disposed between the third installing portion and the second buffering portion, a fourth groove is disposed between the fourth installing portion and the second buffering portion, the third fixing ring is disposed in the third groove, and the fourth fixing ring is disposed in the fourth groove.

Where, alternatively or additionally, several third positioning posts are disposed at intervals on the third fixing ring, several third positioning holes are disposed at intervals along the outer circumference of the third installing portion, and the third positioning holes are configured for accommodating the third positioning posts; and several fourth positioning posts are disposed at intervals on the fourth fixing ring, several fourth positioning holes are disposed at intervals along the outer circumference of the fourth installing portion, and the fourth positioning holes are configured for accommodating the fourth positioning posts.

Where, alternatively or additionally, the second shock-absorbing mechanism further comprises a third fastener and a fourth fastener;

several third fixing holes are disposed at intervals along the outer circumference of the third installing portion, the third fixing holes and the third positioning holes are alternately disposed, the first fixing plate and the third fixing ring are respectively disposed with third through holes, and the third fastener is configured for cooperating with the third through holes and the third fixing holes; and several fourth fixing holes are disposed at intervals along the outer circumference of the fourth installing portion, the fourth fixing holes and the fourth positioning holes are disposed alternately, the second fixing plate and the fourth fixing ring are respectively disposed with fourth through holes, and the fourth fastener is configured for cooperating with the fourth fixing holes and fourth through holes.

Where, alternatively or additionally, the second shock-absorbing mechanism further comprises a third elastic member, the third elastic member is disposed in the hollow structure of the second elastic member, the third elastic member is connected to the fourth installing portion, the third elastic member is disposed around the fourth installing portion, and the third elastic member is configured for clamping a mount.

Where, alternatively or additionally, the second elastic member and the third elastic member are integrally formed.

Where, alternatively or additionally, the first elastic member, the second elastic member, and the third elastic member are all made of a flexible material.

Where, alternatively or additionally, the first elastic member, the second elastic member, and the third elastic member are integrally formed.

An embodiment of the present application also provides an unmanned aerial vehicle. The unmanned aerial vehicle comprises the gimbal 1000, the second fixing plate 20 being connected to the fuselage of the unmanned aerial vehicle.

In comparison with the prior art, an embodiment of the present application provides a shock-absorbing device, a gimbal, and an unmanned aerial vehicle. A plurality of weight-reducing balls are concentrated in one by means of the arrangement of a first elastic member, so that the mount is uniformly stressed in the circumferential direction without causing overload in any direction, thereby improving the stability and safety of the gimbal and the unmanned aerial vehicle.

Finally, it should be noted that: the above embodiments are merely illustrative of the technical solutions of the present disclosure, rather than limiting it; combinations of technical features in the above embodiments or in different embodiments are also possible under the idea of the present disclosure, and the steps can be implemented in any order; there are many other variations of the different aspects of the present disclosure as described above, which are not provided in detail for the sake of brevity; although the present disclosure has been described in detail with reference to the foregoing embodiments, those of ordinary skills in the art will appreciate that the technical solutions disclosed in the above-mentioned embodiments can still be modified, or some of the technical features thereof can be replaced by equivalents; such modifications or replacements do not depart the essence of the corresponding technical solution from the scope of the technical solutions of embodiments of the present disclosure.

The invention claimed is:

1. A shock-absorbing device, comprising:
a first fixing plate;
a second fixing plate disposed on one side of the first fixing plate at intervals;
a first shock-absorbing mechanism comprising a first elastic member connected between the first fixing plate and the second fixing plate, the first elastic member being a hollow structure, the first elastic member being a circular cross-section in a direction parallel to the first fixing plate; and
a second shock-absorbing mechanism comprising a second elastic member installed between the first fixing plate and the second fixing plate and disposed in the first elastic member;
wherein
the first shock-absorbing mechanism and the second shock-absorbing mechanism are provided as independent and separate;
the first elastic member comprises a first installing portion, a second installing portion, and a first buffering portion connected between the first installing portion and the second installing portion, the first installing portion being fixed to the first fixing plate, and the second installing portion being fixed to the second fixing plate; and
the first buffering portion has an arcuate structure, and the first buffering portion extends to a portion away from the hollow structure.

2. The shock-absorbing device according to claim 1, wherein
the first shock-absorbing mechanism further comprises a first fixing ring and a second fixing ring, wherein the first installing portion is fixed to the first fixing plate via the first fixing ring, and the second installing portion is fixed to the second fixing plate via the second fixing ring; and
a first groove is disposed between the first installing portion and the first buffering portion, a second groove is disposed between the second installing portion and the first buffering portion, the first fixing ring is disposed in the first groove, and the second fixing ring is disposed in the second groove.

3. The shock-absorbing device according to claim 1, wherein
several first positioning posts are disposed at intervals on the first fixing ring, several first positioning holes are disposed at intervals along an outer circumference of the first installing portion, and the first positioning holes are configured for accommodating the first positioning posts; and
several second positioning posts are disposed at intervals on the second fixing ring, several second positioning holes are disposed at intervals along the outer circumference of the second installing portion, and the second positioning holes are configured for accommodating the second positioning posts.

4. The shock-absorbing device according to claim 3, wherein the first shock-absorbing mechanism further comprises a first fastener and a second fastener;
several first fixing holes are disposed at intervals along the outer circumference of the first installing portion, the first fixing holes and the first positioning holes are disposed alternately, the first fixing plate and the first fixing ring are respectively disposed with first through holes, and the first fastener is configured for cooperating with the first through holes and the first fixing holes; and
several second fixing holes are disposed at intervals along the outer circumference of the second installing portion, the second fixing holes and the second positioning holes are disposed alternately, the second fixing plate and the second fixing ring are respectively disposed with second through holes, and the second fastener is configured for cooperating with the second fixing holes and the second through holes.

5. The shock-absorbing device according to claim 1, wherein
the second elastic member is a hollow structure, a cross-section of the second elastic member in a direction parallel to the first fixing plate is circular, the second elastic member comprises a third installing portion, a fourth installing portion, and a second buffering portion connected between the third installing portion and the fourth installing portion, the third installing portion is fixed to the first fixing plate, and the fourth installing portion is fixed to the second fixing plate.

6. The shock-absorbing device according to claim 5, wherein
the second buffering portion has an arcuate structure, and the second buffering portion extends toward a portion near the hollow structure of the second elastic member.

7. The shock-absorbing device according to claim 5, wherein
the second shock-absorbing mechanism further comprises a third fixing ring and a fourth fixing ring, wherein the third installing portion is fixed to the first fixing plate via the third fixing ring, and the fourth installing portion is fixed to the second fixing plate via the fourth fixing ring; and a third groove is disposed between the third installing portion and the second buffering portion, a fourth groove is disposed between the fourth installing portion and the second buffering portion, the third fixing ring is disposed in the third groove, and the fourth fixing ring is disposed in the fourth groove.

8. The shock-absorbing device according to claim 7, wherein several third positioning posts are disposed at intervals on the third fixing ring, several third positioning holes are disposed at intervals along the outer circumference of the third installing portion, and the third positioning holes are configured for accommodating the third positioning posts; and several fourth positioning posts are disposed at intervals on the fourth fixing ring, several fourth positioning holes are disposed at intervals along the outer circumference of the fourth installing portion, and the fourth positioning holes are configured for accommodating the fourth positioning posts.

9. The shock-absorbing device according to claim 8, wherein the second shock-absorbing mechanism further comprises a third fastener and a fourth fastener;

several third fixing holes are disposed at intervals along the outer circumference of the third installing portion, the third fixing holes and the third positioning holes are alternately disposed, the first fixing plate and the third fixing ring are respectively disposed with third through holes, and the third fastener is configured for cooperating with the third through holes and the third fixing holes; and several fourth fixing holes are disposed at intervals along the outer circumference of the fourth installing portion, the fourth fixing holes and the fourth positioning holes are disposed alternately, the second fixing plate and the fourth fixing ring are respectively disposed with fourth through holes, and the fourth fastener is configured for cooperating with the fourth fixing holes and fourth through holes.

10. The shock-absorbing device according to claim 5, wherein the second shock-absorbing mechanism further comprises a third elastic member, the third elastic member is disposed in the hollow structure of the second elastic member, the third elastic member is connected to the fourth installing portion, the third elastic member is disposed around the fourth installing portion, and the third elastic member is configured for clamping a mount.

11. The shock-absorbing device according to claim 10, wherein the second elastic member and the third elastic member are integrally formed.

12. The shock-absorbing device according to claim 10, wherein the first elastic member, the second elastic member, and the third elastic member are integrally formed.

13. The shock-absorbing device according to claim 10, wherein the first elastic member, the second elastic member, and the third elastic member are all made of a flexible material.

14. The shock-absorbing device according to claim 1, wherein the second elastic member is a hollow structure defining an aperture, the aperture being configured to receive a mounting structure therein and allow movement of the mounting structure within the aperture and without contacting the second elastic member.

15. A gimbal, comprising a shock-absorbing device and a mount; the mount is installed on the shock-absorbing device, and the mount is configured to mount a camera device, one end of the mount is installed on the first fixing plate, and the other end of the mount extends out of the second fixing plate;

wherein the shock-absorbing device, comprises
a first fixing plate;
a second fixing plate disposed on one side of the first fixing plate at intervals; and
a first shock-absorbing mechanism comprising-a first elastic member connected between the first fixing plate and the second fixing plate, the first elastic member being a hollow structure, the first elastic member being a circular cross-section in a direction parallel to the first fixing plate; and
a second shock-absorbing mechanism comprising a second elastic member installed between the first fixing plate and the second fixing plate and disposed in the first elastic member; and
wherein
the first shock-absorbing mechanism and the second shock-absorbing mechanism are disposed as independent and separate;
the first elastic member comprises a first installing portion, a second installing portion, and a first buffering portion connected between the first installing portion and the second installing portion, the first installing portion being fixed to the first fixing plate, and the second installing portion being fixed to the second fixing plate; and
the first buffering portion has an arcuate structure, and the first buffering portion extends to a portion away from the hollow structure.

16. The gimbal according to claim 15, wherein
the second elastic member is a hollow structure, a cross-section of the second elastic member in a direction parallel to the first fixing plate is circular, the second elastic member comprises a third installing portion, a fourth installing portion, and a second buffering portion connected between the third installing portion and the fourth installing portion, the third installing portion is fixed to the first fixing plate, and the fourth installing portion is fixed to the second fixing plate.

17. The shock-absorbing device according to claim 15, wherein
the second elastic member is a hollow structure defining an aperture, the aperture being configured to receive a mounting structure therein and allow movement of the mounting structure within the aperture and without contacting the second elastic member.

18. An unmanned aerial vehicle, comprising the gimbal, wherein the gimbal, comprising a shock-absorbing device and a mount; the mount is installed on the shock-absorbing device, and the mount is configured to mount a camera device, one end of the mount is installed on the first fixing plate, and the other end of the mount extends out of the second fixing plate;

wherein the shock-absorbing device, comprises
a first fixing plate;
a second fixing plate disposed on one side of the first fixing plate at intervals;
a first shock-absorbing mechanism comprising-a first elastic member connected between the first fixing plate and the second fixing plate, the first elastic member being a hollow structure, the first elastic member being a circular cross-section in a direction parallel to the first fixing plate; and a second shock-absorbing mechanism comprising a second elastic member installed between the first fixing plate and the second fixing plate and disposed in the first elastic member;

wherein the first shock-absorbing mechanism and the second shock-absorbing mechanism are disposed as independent and separate;

the first elastic member comprises a first installing portion, a second installing portion, and a first buffering portion connected between the first installing portion and the second installing portion, the first installing portion being fixed to the first fixing plate, and the second installing portion being fixed to the second fixing plate; and the first buffering portion has an arcuate structure, and the first buffering portion extends to a portion away from the hollow structure.

19. The shock-absorbing device according to claim 18, wherein the second elastic member is a hollow structure defining an aperture, the aperture being configured to receive a mounting structure therein and allow movement of the mounting structure within the aperture and without contacting the second elastic member.

\* \* \* \* \*